(12) United States Patent
Vigliar et al.

(10) Patent No.: US 9,014,508 B2
(45) Date of Patent: Apr. 21, 2015

(54) MULTIPLIERLESS COPROCESSOR FOR DIFFERENCE OF GAUSSIAN (DOG) CALCULATION

(71) Applicant: STMicroelectronics S.r.l., Agrate Brianza (MI) (IT)

(72) Inventors: Mario Vigliar, Nocera Superiore (IT); Gian Domenico Licciardo, Montoro Inferiore (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 153 days.

(21) Appl. No.: 13/869,665

(22) Filed: Apr. 24, 2013

(65) Prior Publication Data

US 2013/0301950 A1 Nov. 14, 2013

Related U.S. Application Data

(60) Provisional application No. 61/637,504, filed on Apr. 24, 2012.

(51) Int. Cl.
*G06K 9/60* (2006.01)
*G06T 5/50* (2006.01)
*G06T 5/00* (2006.01)
*G06T 1/20* (2006.01)

(52) U.S. Cl.
CPC . *G06T 5/50* (2013.01); *G06T 5/003* (2013.01); *G06T 1/20* (2013.01)

(58) Field of Classification Search
None
See application file for complete search history.

(56) References Cited

U.S. PATENT DOCUMENTS

| 6,711,293 | B1 | 3/2004 | Lowe | |
|---|---|---|---|---|
| 8,126,190 | B2* | 2/2012 | Jung et al. | 382/100 |
| 8,792,673 | B2* | 7/2014 | Levien et al. | 382/100 |
| 2012/0183224 | A1 | 7/2012 | Kirsch | |

OTHER PUBLICATIONS

"Hamming distance," retrieved from http://en.wikipedia.org/wiki/Hamming_distance on Jul. 30, 2014, 3 pages.
Calonder et al., "BRIEF: Computing a Local Binary Descriptor Very Fast," *IEEE Transactions on Pattern Analysis and Machine Intelligence* 34(7):1281-1298, Jul. 2012.
Huggett et al., "A Dual-Conversion-Gain Video Sensor with Dewarping and Overlay on a Single Chip," IEEE International Solid-State Circuits Conference (ISSCC) 2009, Session 2—Imagers 2.8, pp. 52-54.
Rosten et al., "Faster and Better: A Machine Learning Approach to Corner Detection," *IEEE Transactions on Pattern Analysis and Machine Intelligence* 32(1):105-119, Jan. 2010.
M. Basu, "Gaussian-Based Edge-Detection Methods—A Survey", IEEE Trans. on Systems, Man and Cybernetics—Part C, 32(3), 2002, pp. 252-260.

(Continued)

*Primary Examiner* — Jingge Wu
(74) *Attorney, Agent, or Firm* — Seed IP Law Group PLLC

(57) ABSTRACT

A hardware architecture is applied to the calculation of a Difference-of-Gaussian filter, which is typically employed in image processing algorithms. The architecture has a modular structure to easily allow the matching of the desired delay/area ratio as well as a high computational accuracy. A new solution is provided for the implementation of multiply-accumulators which allows a significant reduction of area with respect to the conventional architectures.

9 Claims, 7 Drawing Sheets

(56) References Cited

OTHER PUBLICATIONS

D. Lowe, "Distinctive Image Features from Scale-Invariant Keypoints", International Journal of Computer Vision (2004), 60(2), pp. 91-110.

R. Hess, "An Open Source SIFT Library", ACM Proc. of the Int. Conference on Multimedia (MM), Florence (Italy) 2010, http://robwhess.github.io/opensift/.

K. Mizuno et al., "A Low-Power Real-Time SIFT Descriptor Generation Engine for Full HDTV Video Recognition", IEICE Trans. Electron, vol. E94-C, No. 4, Apr. 2011, pp. 448-457.

V. Bonato et al, "A Parallel Hardware Architecture for Scale and Rotation Invariant Feature Detection", IEEE Trans. on Circuits and Systems for Video Tech., vol. 18, No. 12, Dec. 2008, pp. 1703-1712.

E. O'Shea, "Bachet's problem: as few weights to weigh them all", arXiv:1010.5486v1 [math.HO], Oct. 26, 2010, pp. 1-15.

S.K. Park, "The r-complete partitions", Discrete Mathematics, 183 (1998), pp. 293-297.

S. Huang, "High-Performance SIFT Hardware Accelerator for Real-Time Image Feature Extraction", IEEE Trans. on Circuits and Systems for Video Tech., vol. 22, No. 3, Mar. 2012, pp. 340-351.

Pettersson et al., "Online Stereo Calibration using FPGAs," Proceedings of the IEEE Intelligent Vehicles Symposium, Jun. 6-8, 2005, pp. 55-60.

* cited by examiner

MULTIPLIERLESS COPROCESSOR FOR DIFFERENCE OF GAUSSIAN (DOG) CALCULATION

CROSS REFERENCE TO RELATED APPLICATION

This application claims the benefit of U.S. provisional application Ser. No. 61/637,504, filed on Apr. 24, 2012, which application is incorporated herein by reference to the maximum extent allowable by law.

TECHNICAL FIELD

This invention relates to image processing and computer vision and, more particularly, to coprocessors for Difference-of-Gaussian calculations.

DISCUSSION OF THE RELATED ART

Difference-of-Gaussian (DoG) is a band pass filtering operator which is used in image processing. DoG filtering includes the subtraction, pixel by pixel, of two blurred versions of a grayscale image, obtained by convolving the image with two bi-dimensional Gaussian filters having different radii. The effective use of DoG for image processing usually requires the calculation of several DoG images, iteratively applied to the input image. Such processing requires a very large number of multiply accumulate operations, which makes it unusable for real-time software implementation. In order to utilize DoG processing in embedded applications, such as mobile devices, approaches are required to streamline the multiply accumulate operations so as to limit chip area and provide acceptable processing speed. Accordingly, there is a need for improved multiplier accumulator implementations.

SUMMARY OF THE INVENTION

According to a first aspect of the invention, a multiplier accumulator comprises a first lookup table configured to provide Bachet terms in response to an input pixel value; a plurality of second lookup tables configured to provide intermediate values in response to the Bachet terms; and a set of full adders configured to sum the intermediate values from the second lookup tables and to provide an output value representative of the input pixel value multiplied by a coefficient.

According to a second aspect of the invention, a multiply accumulate method comprises providing Bachet terms from a first lookup table in response to an input pixel value; providing intermediate values from a plurality of second lookup tables in response to the Bachet terms; and summing the intermediate values with a set of full adders to provide an output value representative of the input pixel value multiplied by a coefficient.

DETAILED DESCRIPTION

Difference-of-Gaussian (DoG) is a filtering operator including of the subtraction, pixel-by-pixel, of two blurred versions of a grayscale image, obtained by convolving the image with two bi-dimensional Gaussian filters with different radii. This operator is very widely used in image processing and computer vision, where it represents one of the most efficient ways of performing edge detection, and is the initial step of several image detection algorithms, where it is used as an approximation of the scale-normalized Laplacian-of-Gaussian (LoG).

From the definition:

$$DoG(x, y, \sigma) = L(x, y, k\sigma) - L(x, y, \sigma)$$
$$= G(x, y, k\sigma) * I(x, y) - G(x, y, \sigma) * I(x, y)$$

where $$G(x, y, \sigma) = \frac{1}{2\pi\sigma^2} e^{-\frac{x^2+y^2}{2\sigma^2}},$$

I(x, y) is the input image, k∈R and "*" is the convolution operator.

Since an effective use of DoG for image detection usually requires the calculation of several DoGs, iteratively applied on the input image, the huge amount of multiply-accumulator (MAC) operations makes it unusable for real-time software implementation, employing general purpose processors, and requires an efficient hardware implementation to reduce the MAC delays and the amount of physical resources required for their implementation, together with an adequate organization of the processing flow coherently with the input stream of pixels. Although the DoG algorithm and its employment in image detection are known, all the proposed hardware implementations resort to significant simplifications to match acceptable specifications of area/delay ratio.

Figure 1:
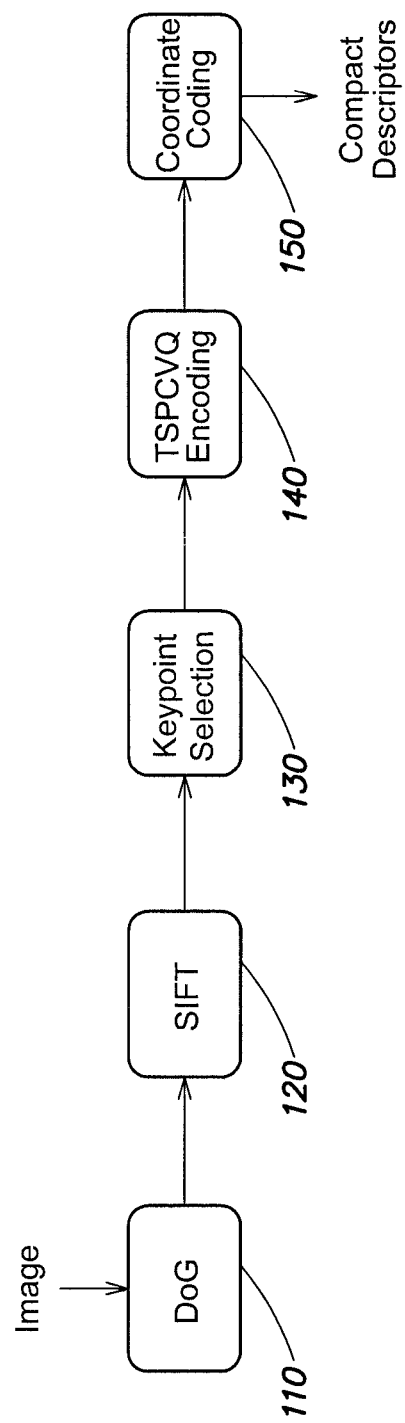
FIG. 1 is a flow chart of a process for extracting compact descriptors from an image.

The MPEG committee, through a working group called Compact Descriptor for Visual Search, has created a test model. The principal technologies used are:
Difference-of-Gaussian (DoG)
Scale-invariant feature transform (SIFT)
Keypoint selection
Tree-structured product-codebook vector quantization
Strong geometric consistency check
Distance Ratio Coherence (DISTRAT)
Bag of Features The extraction part of the test model is shown in FIG. 1. As shown, the extraction process includes DoG processing 100 of an input image, followed by scale-invariant feature transform processing 110, keypoint selection 120, tree-structured product-codebook vector quantization 130 and coordinate coding 140 to provide compact descriptors.

DoG is clearly the primary block very close to image sensor and therefore has to use minimal complexity and memory to achieve affordable costs.

Figure 2:
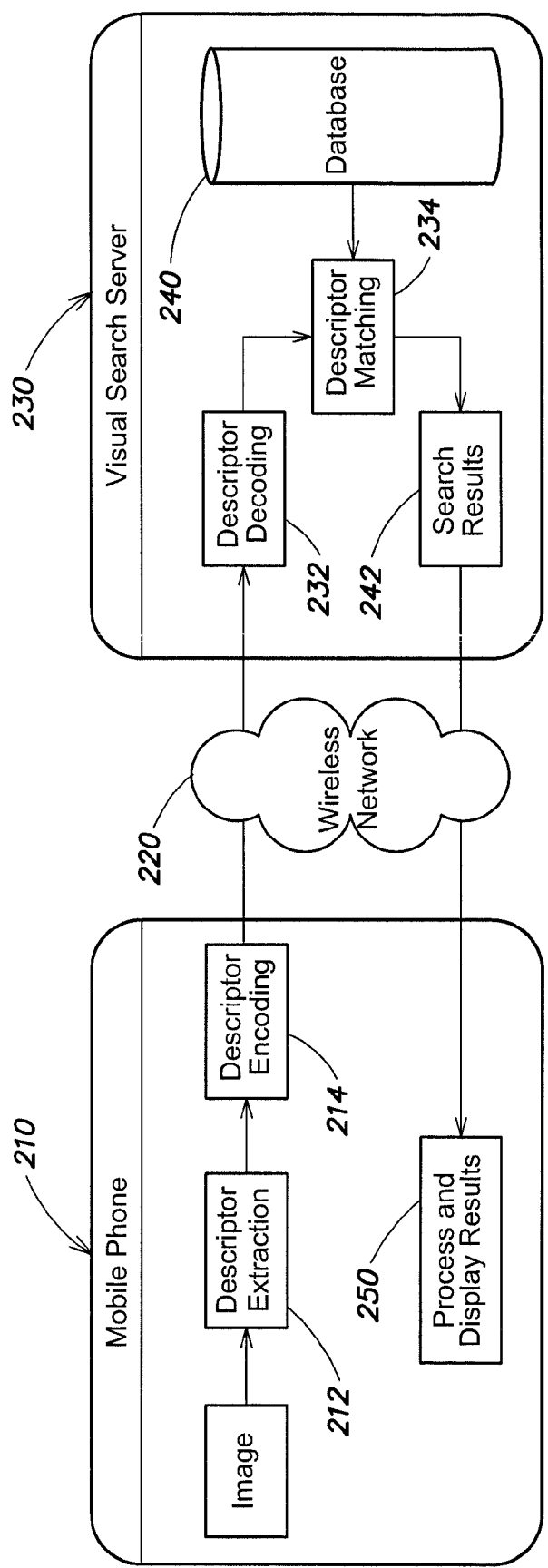
FIG. 2 is a block diagram of a system for extracting compact descriptors from an image.

The system embodiment of the extractor is shown in FIG. 2. As shown, a mobile phone 210 includes descriptor extraction 212 and descriptor encoding 214. The encoded descriptor is sent via a wireless network 220 to a visual search server 230 which performs descriptor decoding 232 and descriptor matching 234 to reference descriptors contained in a database 240. Search results 242 provided by the descriptor matching 234 are sent via the wireless network 220 to the mobile phone 210 for process and display 250 of the results.

The bi-dimensional Gaussian function is quantized at pixel resolution and is expressed as a convolution 2D (two-dimensional) kernel matrix. The coefficients of the kernels greater than |3σ| have been neglected in both dimensions. This choice allows the processing of the input image by regions-of-interest (ROI) of (N×N) pixels, where N is the minimum dimension permitted for Gaussian kernels without significant loss of accuracy and a consequent reduction of input memory buffer.

In the prior art, the whole DoG computing pipeline is constrained to floating-point arithmetic, 32-bit single precision IEEE-754 compliant ("FP32" hereafter). These FP32 units often require some additional logic to be used to synchronize the data path from/to the CPUs, commonly implemented as tightly/loosely coupled coprocessors in SoCs (System on Chip). Therefore the obtained performance is much worse than what is achievable with integer-only arithmetic, in terms of both speed and code compactness. When designing custom hardware for DoG, moreover, a FP32 implementation keeps the designs huge in size and hardly fittable in relatively small environments, as in embedded devices. A fixed-point approach could be helpful in reducing the needed gates to obtain a working system, with an overall advantage for the whole processing pipeline.

When computing the Gaussian filter, the separability of the kernel can be exploited, enabling a bi-dimensional Gaussian filter to be expressed as a serial convolution of two mono-dimensional Gaussian filters without any loss of accuracy:

$$G(x, y, \sigma) = \frac{1}{2\pi\sigma^2} e^{-\frac{x^2+y^2}{2\sigma^2}} = \frac{1}{\sqrt{2\pi}\,\sigma} e^{-\frac{x^2}{2\sigma^2}} \times \frac{1}{\sqrt{2\pi}\,\sigma} e^{-\frac{y^2}{2\sigma^2}} = G(x, \sigma) \times G(y, \sigma)$$

In this way, the original N×N complexity of the bi-dimensional Gaussian filter is reduced to 2 N, where N is the dimension of the Gaussian kernel.

Tests have been conducted to prove the effective trade-off between the minimum number of bits needed in Fixed-Point arithmetic to implement a 2D full Gaussian kernel and its 1+1D separable counterpart. Even if not effectively used in practical implementations, the 2D full kernel has been studied to better estimate the round-off error accumulations in longer sequences of operations, and thus prove the robustness of the proposed solution.

Error evaluation considering the bitsizes from 8 to 32 bits—with integer part computed per-filter basis—is shown in Table 1. The bitsize is considered constant over the single execution. In each iteration, the error value of the filter coefficient is computed as an Inf-norm vector difference between the FP32 and the actual fixed-point version. The summed error upper bound over the kernel application is estimated as worst case over the window's number of elements (N for 1D or its square for 2D kernel).

TABLE 1

| | FP-to-FI Gaussian 2D Error - Upper bound - 1st Octave | | | | |
|---|---|---|---|---|---|
| Bits | Scale 1 | Scale 2 | Scale 3 | Scale 4 | Scale 5 |
| 8  | 23.105     | 34.084     | 41.27      | 63.065     | 87.422     |
| 9  | 23.105     | 34.084     | 41.27      | 63.065     | 87.422     |
| 10 | 19.871     | 28.283     | 41.27      | 63.065     | 87.422     |
| 11 | 8.3283     | 13.522     | 34.255     | 52.105     | 87.422     |
| 12 | 4.837      | 8.3071     | 16.438     | 25.89      | 72.258     |
| 13 | 2.7155     | 4.1859     | 9.4261     | 14.668     | 35.946     |
| 14 | 1.2764     | 2.3963     | 4.3629     | 7.3813     | 19.888     |
| 15 | 0.88214    | 1.2907     | 2.6832     | 4.0998     | 10.319     |
| 16 | 0.48326    | 0.6327     | 1.2611     | 2.5119     | 6.5633     |
| 17 | 0.22585    | 0.40524    | 0.77429    | 1.2348     | 3.0508     |
| 18 | 0.07131    | 0.14916    | 0.32332    | 0.6062     | 1.5142     |
| 19 | 0.05307    | 0.075195   | 0.16106    | 0.25616    | 0.85843    |
| 20 | 0.026095   | 0.046838   | 0.08784    | 0.1602     | 0.39075    |
| 21 | 0.014251   | 0.019552   | 0.046429   | 0.074307   | 0.2106     |
| 22 | 0.0061819  | 0.010563   | 0.027193   | 0.035313   | 0.097649   |
| 23 | 0.0037339  | 0.0052269  | 0.011807   | 0.019771   | 0.047978   |
| 24 | 0.0013845  | 0.0023951  | 0.0053229  | 0.0096273  | 0.0248     |
| 25 | 0.00090184 | 0.0010548  | 0.0031599  | 0.0049947  | 0.012285   |
| 26 | 0.00043717 | 0.000701   | 0.0014692  | 0.0026686  | 0.0064765  |
| 27 | 0.00016045 | 0.00037849 | 0.00069142 | 0.0010567  | 0.0035411  |
| 28 | 0.00012985 | 0.00015825 | 0.00037907 | 0.00058083 | 0.0014941  |
| 29 | 4.6722e−05 | 8.5883e−05 | 0.00021185 | 0.00028645 | 0.00084353 |
| 30 | 2.7866e−05 | 3.6469e−05 | 0.00010936 | 0.00013766 | 0.00040748 |
| 31 | 1.48e−05   | 2.1536e−05 | 4.2802e−05 | 7.5474e−05 | 0.00020806 |
| 32 | 4.879e−06  | 1.119e−05  | 2.2005e−05 | 4.2887e−05 | 0.00010086 |

The same results for the 1D (one-dimensional) separable kernel are shown in Table 2.

TABLE 2

FP-to-FI Gaussian 1D Error - Upper bound - 1st Octave

| Bits | Scale 1 | Scale 2 | Scale 3 | Scale 4 | Scale 5 |
|------|---------|---------|---------|---------|---------|
| 8  | 1.9892    | 1.5741    | 1.9723    | 1.5145    | 2.1639    |
| 9  | 0.92537   | 0.79314   | 0.87505   | 0.76212   | 1.0439    |
| 10 | 0.31727   | 0.34064   | 0.4929    | 0.35542   | 0.51085   |
| 11 | 0.26078   | 0.18433   | 0.24439   | 0.19059   | 0.27076   |
| 12 | 0.081617  | 0.095047  | 0.11295   | 0.09562   | 0.13375   |
| 13 | 0.059008  | 0.050639  | 0.054639  | 0.047991  | 0.067603  |
| 14 | 0.034291  | 0.024211  | 0.029361  | 0.023263  | 0.03233   |
| 15 | 0.014689  | 0.010557  | 0.013337  | 0.011026  | 0.015632  |
| 16 | 0.008179  | 0.0061799 | 0.0077757 | 0.0058753 | 0.0079823 |
| 17 | 0.0035615 | 0.0026849 | 0.0038425 | 0.0022372 | 0.0042119 |
| 18 | 0.0018789 | 0.0011796 | 0.0019782 | 0.0014148 | 0.0021361 |
| 19 | 0.00086481 | 0.00055152 | 0.00099973 | 0.00071135 | 0.00096197 |
| 20 | 0.00048856 | 0.00038614 | 0.00051249 | 0.0003752 | 0.00052665 |
| 21 | 0.00026564 | 0.00016775 | 0.00021092 | 0.00017521 | 0.00026246 |
| 22 | 0.00013166 | 9.2218e−05 | 0.00011447 | 7.9677e−05 | 0.00012281 |
| 23 | 6.0758e−05 | 4.9512e−05 | 5.1245e−05 | 4.6011e−05 | 6.0579e−05 |
| 24 | 2.7832e−05 | 2.3237e−05 | 3.212e−05 | 2.0702e−05 | 3.3168e−05 |
| 25 | 9.3567e−06 | 1.0589e−05 | 1.6052e−05 | 1.1172e−05 | 1.4329e−05 |
| 26 | 8.1498e−06 | 6.1135e−06 | 6.3083e−06 | 5.648e−06 | 8.1017e−06 |
| 27 | 2.9139e−06 | 1.8093e−06 | 3.8469e−06 | 2.8203e−06 | 3.7828e−06 |
| 28 | 2.0827e−06 | 1.5407e−06 | 1.798e−06 | 1.3075e−06 | 2.0064e−06 |
| 29 | 7.7365e−07 | 7.6509e−07 | 9.8694e−07 | 7.4099e−07 | 1.0304e−06 |
| 30 | 4.3332e−07 | 3.8232e−07 | 4.3265e−07 | 3.1242e−07 | 4.6055e−07 |
| 31 | 2.3721e−07 | 1.7787e−07 | 2.286e−07 | 1.8415e−07 | 2.5095e−07 |
| 32 | 1.2808e−07 | 8.541e−08 | 1.2634e−07 | 8.4426e−08 | 1.288e−07 |

The coefficient errors are comparable with the least significant coefficient in correspondence of combinations in which the total summed error is >0.5. The upper bound on the ID kernel considers only one application of the filter, thus underestimating the total summed error over a complete horizontal+vertical execution. A safe worst case condition is to consider the error as 4 times larger than actually shown (2 adders in the chain from single filters to the final one). Therefore, the minimum bitsize allowed to be used as a viable approximation of the Gaussian kernel at any radius/mask size starts from 21 bits, and 24 is used in the proposed implementation ("FI24" hereafter).

Figure 3:
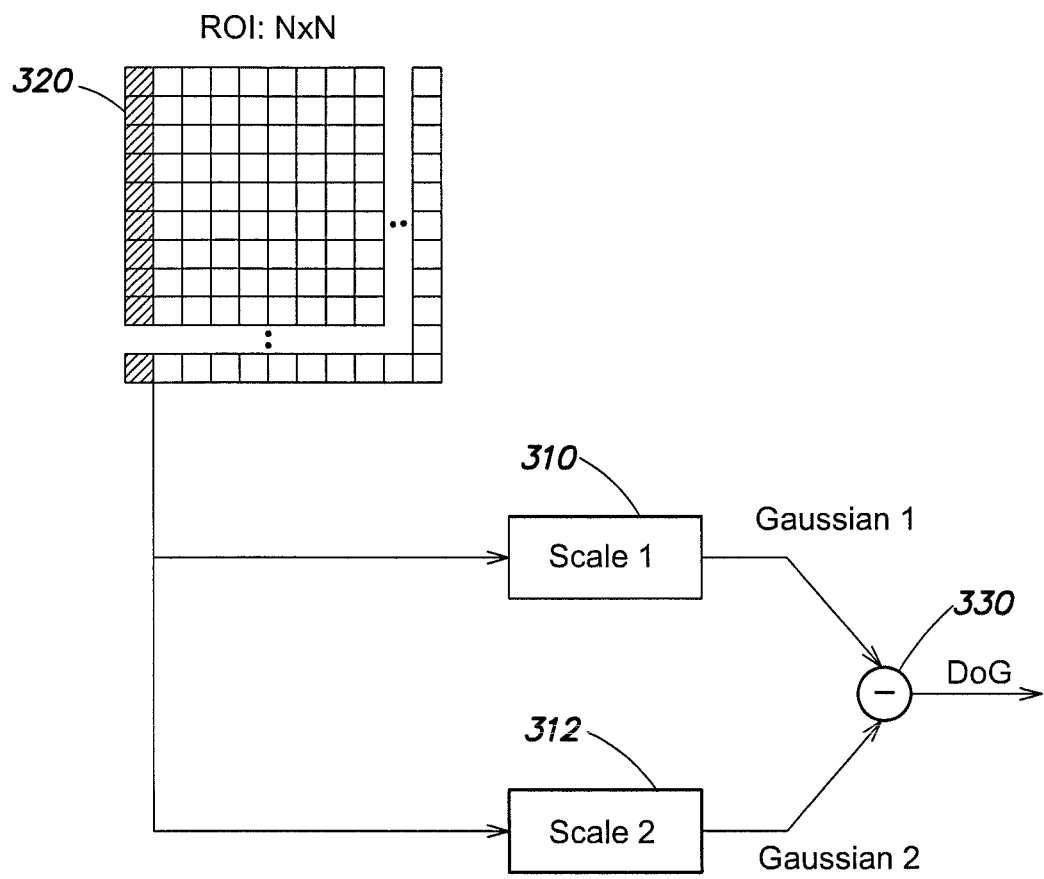
FIG. 3 is a block diagram of an architecture for performing Difference-of-Gaussian calculations.

The DoG architecture is shown in FIG. 3 and includes scale modules 310 and 312 that filter in parallel an ROI 320 of an image with Gaussian kernels of different radii, thus avoiding an intermediate buffering of one blurred image. All the intermediate values are expanded to FI24 having 15 bits for the decimal part. The outputs of scale modules 310 and 312 are subtracted by a DoG subtractor 330 to provide a DoG image.

Figure 4:
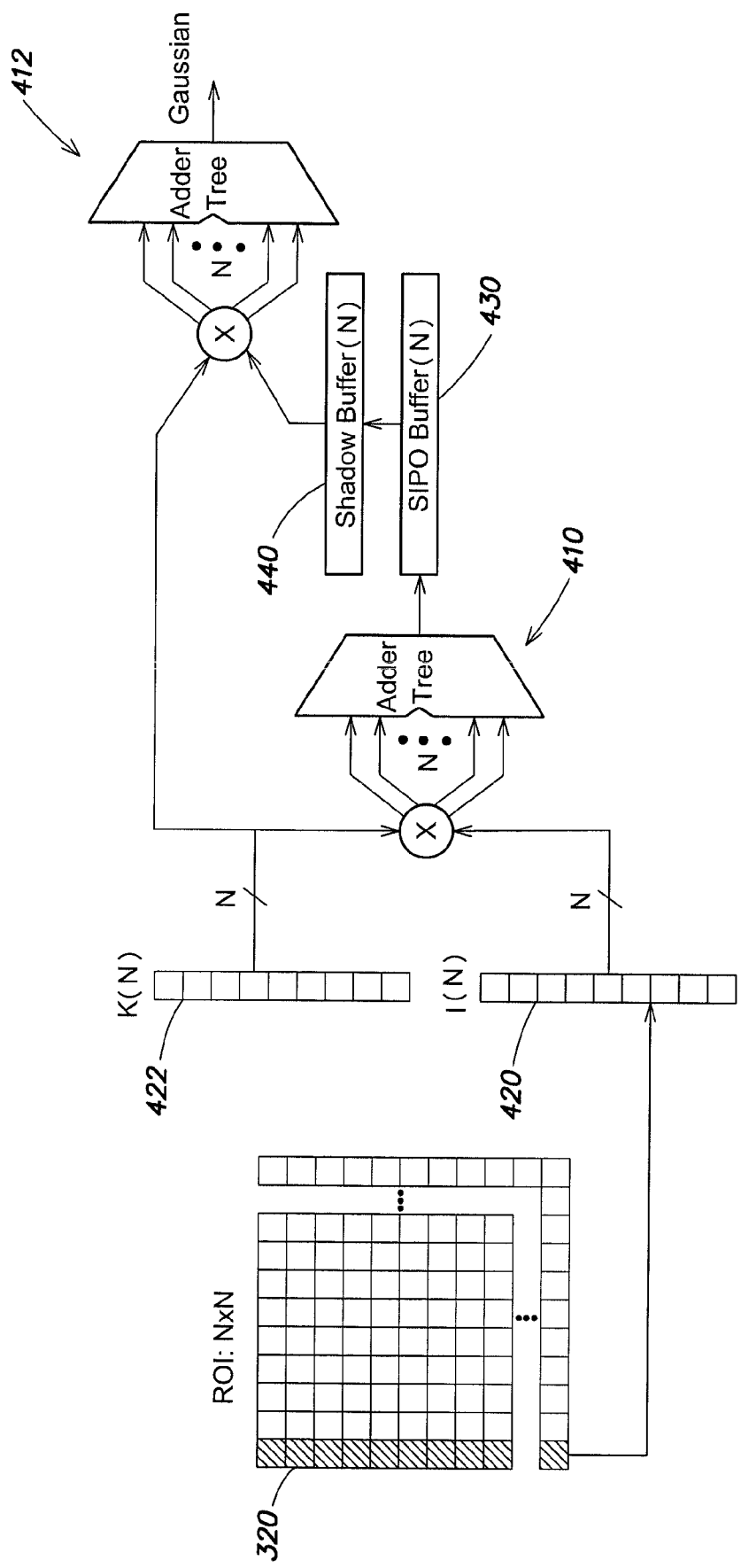
FIG. 4 is a block diagram of the architecture of a scale module shown in FIG. 3, in accordance with embodiments of the invention.

The architecture of a scale module is shown in FIG. 4 and includes the series connection of two similar filter stages 410, 412, each implementing a one-dimensional Gaussian filter, as previously described.

The processing proceeds on a single ROI 320 of the image to be processed. Each pixel of a row (or column) of the image portion is multiplied by a coefficient of the kernel vector in first filter stage 410. The pixel data is provided by a buffer 420 and the Gaussian coefficient is provided by a buffer 422. The resulting products are added together to obtain a partial coefficient to be stored in a parallel-input-serial-output (PISO) buffer 430. After the processing of all the rows (columns) of the ROI 320, the resulting N-dimensional vector of partial coefficients is filtered by the second filter stage 412 in the same way as the first filter stage 410, to calculate the Gaussian filtered pixel occupying the central position of the ROI. An intermediate shadow buffer 440 is employed to ensure the data consistency during the processing by the second filter stage 412.

The filtering of the next central pixel requires only the processing of one more row (column), since N−1 of the previous partial coefficients can be kept. This property also avoids the management of the overlap between adjacent ROIs when an adequate strategy is implemented for loading data into the ROI buffer.

Figure 5:
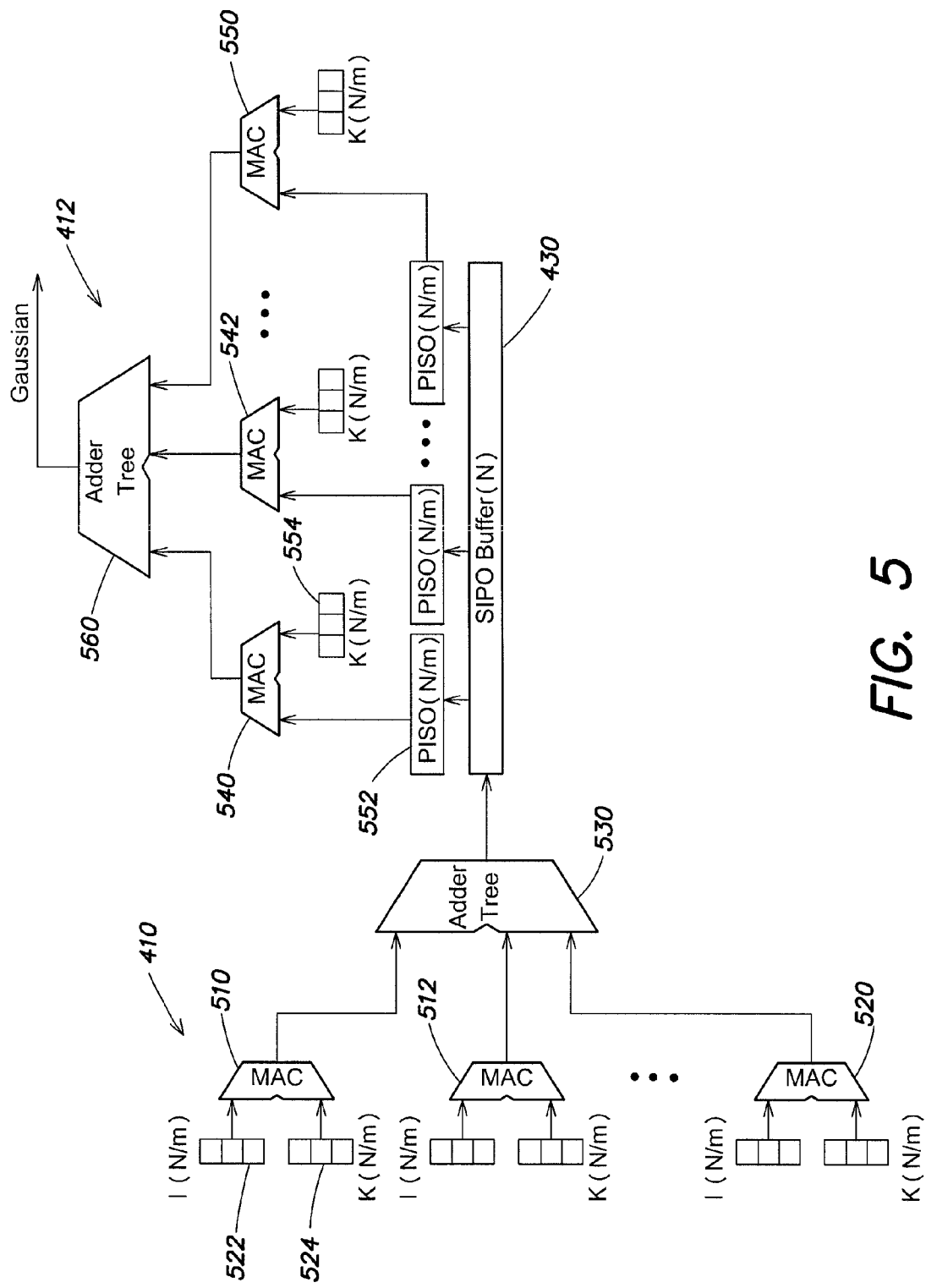
FIG. 5 is a block diagram of the architecture of a scale module as shown in FIG. 3, in accordance with embodiments of the invention.

To avoid an excessive number of MAC elements, the proposed scale structure can be modularized as shown in FIG. 5, where the buffers of the kernel coefficients, the input pixels and the partial coefficients are divided in N/m PISO, buffers, each to be serially processed. This solution reduces the number of MAC elements from N to N/m, where m can be chosen to match the desired delay/area specifications.

As shown in FIG. 5, filter stage 410 includes MACs 510, 512, ... 520 providing outputs to an adder tree 530. The MAC 510 receives inputs from an input pixel buffer 522 of dimension N/m and a Gaussian coefficient buffer 524 of dimension N/m. The adder tree 530 provides an output to buffer 430. Filter stage 412 includes MACs 540, 542, ... 550 providing outputs to an adder tree 560. The MAC 540 receives inputs from a parallel-in, serial-out buffer 552 and a Gaussian coefficient buffer 554. Adder tree 560 provides an output of the scale module.

Considering that the DoG algorithm is properly defined for 8-bit input data and that the two-stage 1+1D separable kernel also produces unsigned integer 8-bit subproducts, it is possible to determine a processing schema which completely avoids the n-bit multipliers (either floating or fixed point).

In fact, given that the range of input is fixed at 256 possible values, it is possible to consider the multiplication operation as a table lookup in a pre-programmed RAM or ROM structure. Preserving the final sum stage, it is possible to completely hide the complexity of the Gaussian convolution in a simple $O(n)$ or $O(n^2)$ sequence of operations, respectively for the separable and full-kernel cases. Also, a wider bitsize for coefficients can be used, thus reducing the total cumulative error, with a minimum waste of space and minimum impact on the summing units.

Considering the Gaussian kernel's symmetry, the total number of coefficients to be stored can be reduced to half the total amount plus one per row. Given the different scales, the required memory space can be computed:

| Scale | Kernel size | Coeff./row | Size @ FP32 | Size @ FI24 |
|---|---|---|---|---|
| 1 | [9 1] | 5 | 5,100 Bytes | 3,825 Bytes |
| 2 | [13 1] | 7 | 7,140 Bytes | 5,355 Bytes |
| 3 | [17 1] | 9 | 9,180 Bytes | 6,885 Bytes |
| 4 | [25 1] | 13 | 13,260 Bytes | 9,945 Bytes |
| 5 | [35 1] | 18 | 18,360 Bytes | 13,770 Bytes |

Considering that the whole DoG process will be completed in a much longer time than a table reloading, it is possible to limit the total size of the coefficients' LUT to the size occupied by Scale 5 and setting the remaining terms to zero as padding when operating at lower filter sizes.

In order to reduce the LUT size for the lookup multiplier, some analytic results of elementary number theory can be recalled, in particular the Bachet's weighting problem, as described by E. O'Shea, "Bachet's problem: as few weights to weigh them all", arXiv: 1010:548 v1 [math.Ho]. It is possible to cite two important definitions and propositions. Let us define the multi-set $W_m := \{1, 3, 3^2, \ldots, 3^{n-1}, m-(1+3+3^2+\ldots+3^{n-1})\}$ and the following claim:

Proposition 1: Every integer weight l with $0 \le l \le m$ can be measured using a two-scale balance with the weights from the multi-set $W_m$.

The proof of the proposition is omitted as outside the scope of this document. A partition of a positive integer m is an ordered sequence of positive integers that sum to m: $m = \lambda_0 + \lambda_1 + \lambda_2 + \ldots + \lambda_n$ with $\lambda_0 \le \lambda_1 \le \lambda_2 \le \ldots \le \lambda_n$. We call the n+1 $\lambda_i$ the parts of the partition.

Let us call a partition of m a Bachet partition if
(1) every integer $0 \le l \le m$ can be written as $l = \sum_{i=0}^{n} \beta_i \lambda_i$ where each $\beta_i \in \{-1, 0, 1\}$
(2) there does not exist another partition of m satisfying (1) with fewer parts than n+1.

Summing 1 to each term (I), we can rewrite the claim as:
(1') every integer $0 \le l \le 2m$ can be written as $l = \sum_{i=0}^{n} \alpha_i \lambda_i$ where each $\alpha_i \in \{0, 1, 2\}$
representing a so called 2-complete partition. Due to the properties of 2-complete partitions, we are able to prove this theorem:

Theorem 1: A Bachet partition of a positive integer m has precisely $\lfloor \log_3(2m) \rfloor + 1$ parts. This result can enable us to think about rewriting the FP or FI multiplication used in DoG as the sum in (1) or (1') by choosing as $\lambda_i$ the first 6 powers of 3 (as our inputs are in the range [0; 255]), taken as additive or subtractive terms. The $G_i$ coefficients are the Gaussian kernel terms. Given that the largest kernel used in DoG processing is K pixels wide, we can rewrite the generic term of the 1D Gaussian convolution as:

$$G(x, \sigma) * I(x) = \sum_{i=0}^{K} G_i \cdot I_{i-\frac{K}{2}} = \sum_{i=0}^{K} G_i \sum_{j=0}^{n} \beta_j \lambda_j = \sum_{i=0}^{K} \sum_{j=0}^{n} G_i \lambda_j \beta_j$$

The input pixel value is expressed as a sum over a Bachet's partition. The product $G_i \lambda_j$ can be easily pre-computed for each value in the range [0; 255] and every kernel coefficient. $B_j$ terms only affect the sign of the product, and the numerical scheme adopted for the implementation uses the sign bit instead of the two's complement notation, thus simplifying the structure. Due to the symmetry, we can store only $$\left\lceil \frac{K}{2} \right\rceil$$

terms in the LUT memory.

Figure 6:
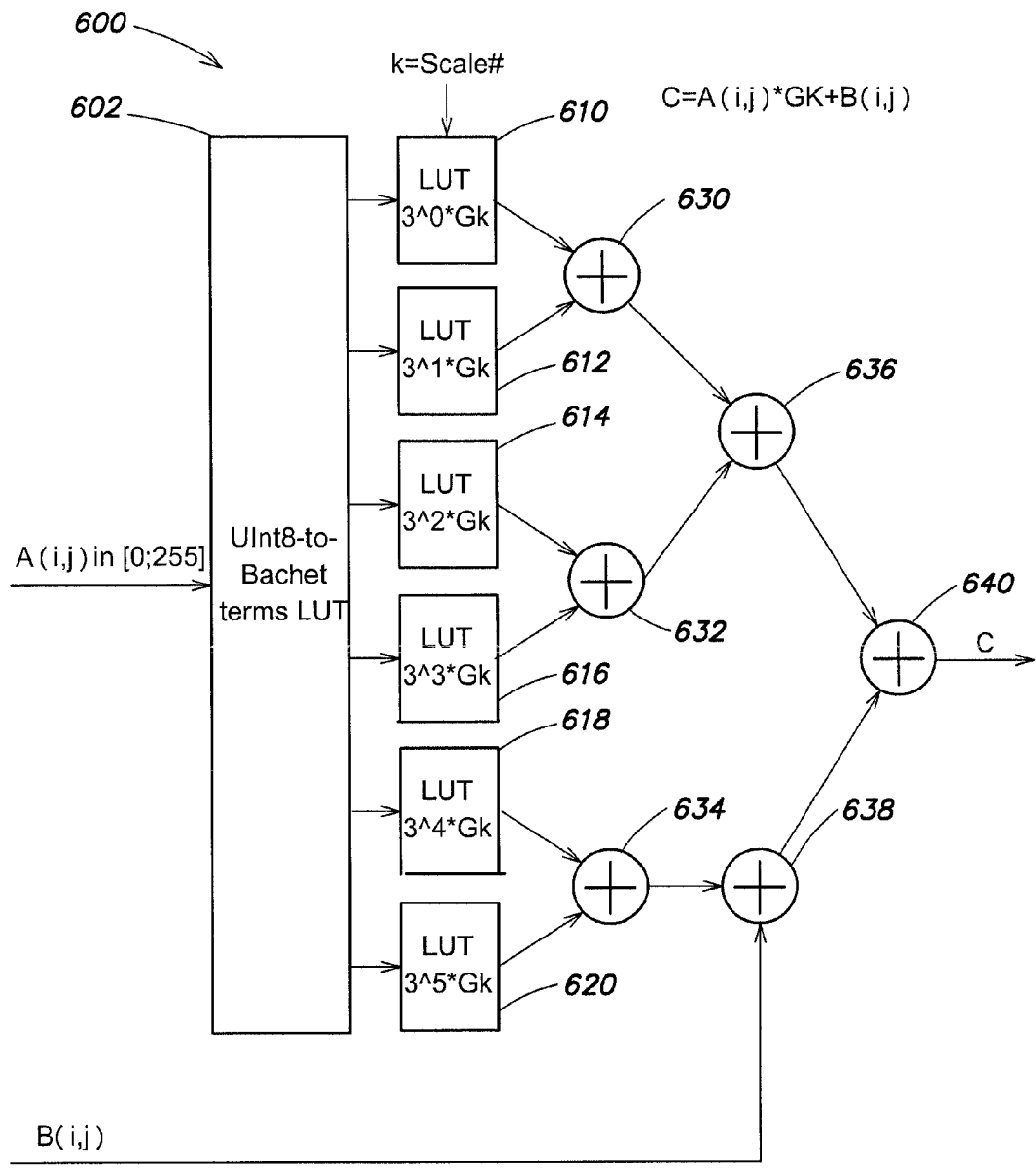
FIG. 6 is a block diagram of a multiplier accumulator element, in accordance with embodiments of the invention.

In terms of processing elements, a single "Bachet multiplier" is made up of 5 full adders and 6 LUTs, and total requirements can be summarized as:

32 bit FP/FI precision 1 scale at a time 420 bytes of dual port SRAM 32 bit FP/FI precision 5 scales at the same time 2400 bytes of dual port SRAM FIG. 6 illustrates a block diagram of the resulting MAC element. Adder widths are incremented with respect to the depth of the pipeline. As follows from the considerations in the previous paragraphs, an initial precision of 20 to 23 bits FI at the "LUT 3^i" stage can be used to fulfill the requirements in terms of error propagation. Actual implementation is a fully pipelined design, with 5 stages of depth (5+n clocks needed to emit results for n incoming multiplications).

As shown in FIG. 6, a MAC element 600 includes a lookup table (LUT) 602 to provide Bachet terms in response to a pixel value A(i,j). Outputs of lookup table 602 are provided to second lookup tables 610, 612, 614, 616, 618 and 620. The outputs of lookup tables 610, 612, 614, 616, 618 and 620 are selected according to a scale number k. The outputs of lookup tables 610 and 612 are provided to a full adder 630; the outputs of lookup table 614 and 616 are provided to a full adder 632; and the outputs of lookup tables 618 and 620 are provided to a full adder 634. The outputs of adders 630 and 632 are provided to a full adder 636. A full adder 638 receives the output of adder 634 and an input value B(i,j). A full adder 640 receives the outputs of adders 636 and 638. If input value B(i,j) is not required, the output of adder 634 can be provided directly to adder 640, and adder 638 may be omitted.

Figure 7:
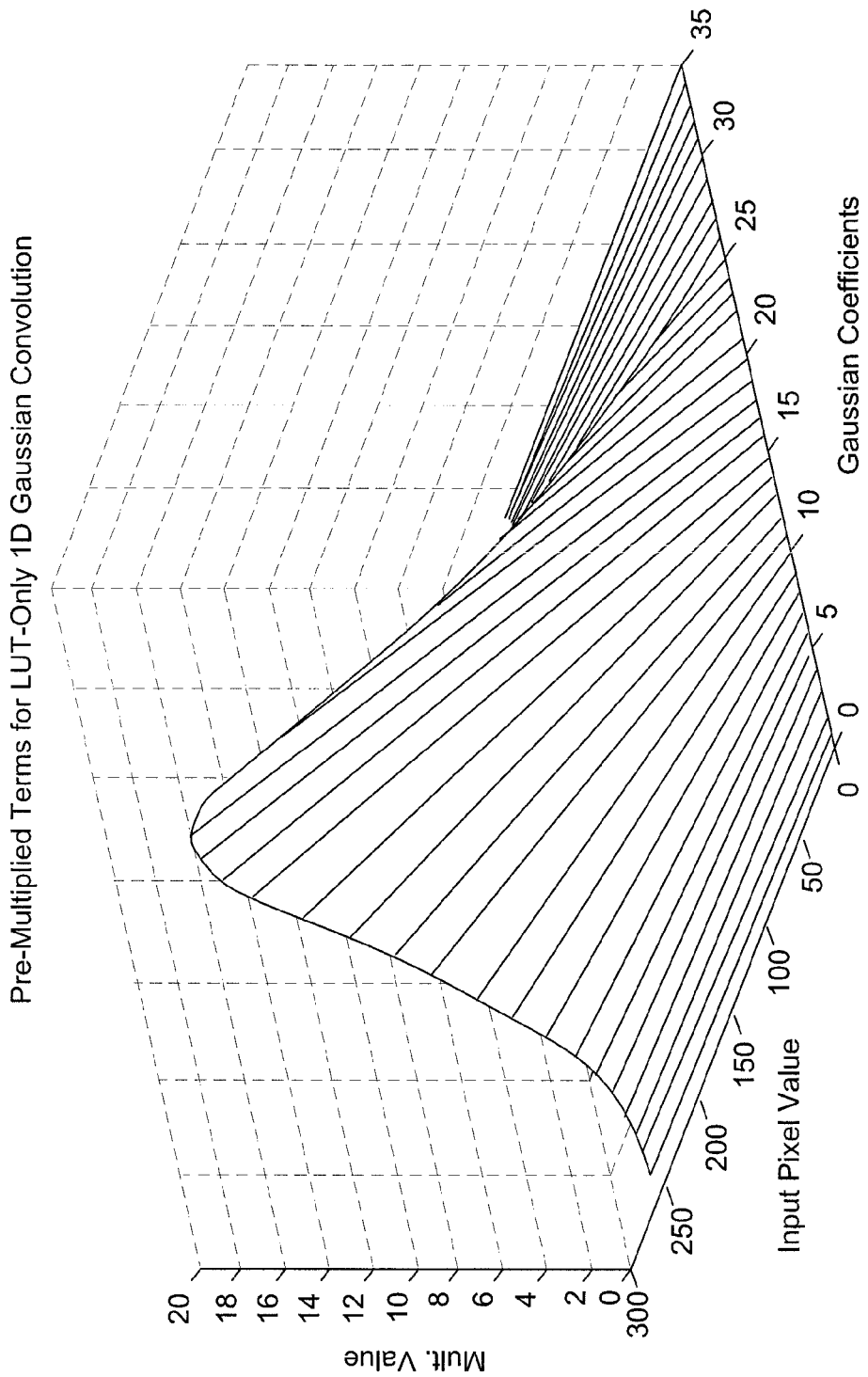
FIG. 7 is a graphic representation of premultiplied terms for a lookup table one-dimensional Gaussian convolution.

FIG. 7 is a graphic representation of values to be stored in the lookup table based on premultiplication of input pixel values and Gaussian coefficients.

In steady state conditions, namely when all the intermediate buffers are filled, considering that the multiplier-less architecture requires one clock cycle to calculate a product in pipeline (with a constant startup delay $d_b$ if Bachet's multiplier is used), $m+d_b$ clock cycles are needed to multiply kernel coefficients with pixels from the PISO buffer, $$\log_2\left(\frac{N}{m}\right)$$

is the depth of the adder tree to complete the convolution and one cycle is needed to store partial products in the shadow buffer, the overall delay introduced by the architecture in FIG. 3 is $$m + \log_2\left(\frac{N}{m}\right) + 1$$

clock cycles. This quantity can be reduced to m+2 clock cycles if the adder tree is purely combinatorial. The complete DoG requires one more cycle for the last difference computation.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A multiplier accumulator circuit comprising:
   a first lookup table configured to provide Bachet terms in response to an input pixel value;
   a plurality of second lookup tables configured to provide intermediate values in response to the Bachet terms; and
   a set of full adders configured to sum the inte mediate values from the second lookup tables and to provide an output value representative of the input pixel value multiplied by a coefficient.

2. A multiplier accumulator circuit as defined in claim 1, wherein the set of full adders is configured to add a further input value to the output value representative of the input pixel value multiplied by the coefficient.

3. A multiplier accumulator circuit as defined in claim 1, configured for use in a Difference-of-Gaussian calculation, wherein the coefficient is a Gaussian coefficient.

4. A multiplier accumulator circuit as defined in claim 1, wherein the input pixel value is an eight-bit data value.

5. A multiplier accumulator circuit as defined in claim 1, wherein the plurality of second lookup tables includes six second lookup tables and wherein the set of full adders includes five full adders.

6. A multiplier accumulator circuit as defined in claim 2, wherein the plurality of second lookup tables includes six second lookup tables and wherein the set of full adders includes six full adders.

7. A multiply accumulate method comprising:
   providing Bachet terms from a first lookup table in response to an input pixel value;
   providing intermediate values from a plurality of second lookup tables in response to the Bachet terms; and
   summing the intermediate values with a set of full adders to provide an output value representative of the input pixel value multiplied by a coefficient.

8. A multiply accumulate method as defined in claim 7, further comprising adding a further input value to the output value representative of the input pixel value multiplied by the coefficient.

9. A multiply accumulate method as defined in claim 7, used in a Difference-of-Gaussian calculation, wherein the coefficient is a Gaussian coefficient.

* * * * *

UNITED STATES PATENT AND TRADEMARK OFFICE
CERTIFICATE OF CORRECTION

PATENT NO. : 9,014,508 B2  
APPLICATION NO. : 13/869665  
DATED : April 21, 2015  
INVENTOR(S) : Mario Vigliar et al.

Page 1 of 1

It is certified that error appears in the above-identified patent and that said Letters Patent is hereby corrected as shown below:

Claims

Column 9, Line 17, Claim 1:
"a set of full adders configured to sum the inte mediate" should read, --a set of full adders configured to sum the intermediate--.

Signed and Sealed this
Fifth Day of January, 2016

Michelle K. Lee
*Director of the United States Patent and Trademark Office*